(12) United States Patent
Nagaoka

(10) Patent No.: US 6,830,404 B2
(45) Date of Patent: Dec. 14, 2004

(54) INPUT PEN

(75) Inventor: Toshimasa Nagaoka, Hiratsuka (JP)

(73) Assignee: Pilot Precision Kabushiki Kaisha, Kanagawa-ken (JP)

( * ) Notice: Subject to any disclaimer, the term of this patent is extended or adjusted under 35 U.S.C. 154(b) by 0 days.

(21) Appl. No.: 10/397,344

(22) Filed: Mar. 27, 2003

(65) Prior Publication Data

US 2003/0185619 A1 Oct. 2, 2003

(30) Foreign Application Priority Data

| Mar. 29, 2002 | (JP) | ........................................ | 2002-093412 |
| Apr. 9, 2002 | (JP) | ........................................ | 2002-105933 |
| May 22, 2002 | (JP) | ........................................ | 2002-147043 |

(51) Int. Cl.[7] ............................................. B43K 23/00
(52) U.S. Cl. ...................... 401/258; 401/37; 401/131; 401/195; 345/179
(58) Field of Search ............................ 401/37, 52, 131, 401/195, 258–260; 345/179; 178/19.01–19.07

(56) References Cited

U.S. PATENT DOCUMENTS 3,941,490 A * 3/1976 Anton ........................ 401/110
5,703,626 A * 12/1997 Itoh et al. .................... 345/173
6,361,232 B1 * 3/2002 Nagaoka et al. ............. 401/37

* cited by examiner

Primary Examiner—Gregory L. Huson
Assistant Examiner—Peter deVore
(74) Attorney, Agent, or Firm—Wenderoth, Lind & Ponack, L.L.P.

(57) ABSTRACT

An input pen is capable of being held in any one of input pen holding parts, respectively having different shapes, of various personal digital assistants. The input pen has a barrel, and stopping members fitted in opposite end parts of a metal tube. An elastic member is placed between the stopping members so as to push the stopping members outwardly. The metal tube is fitted in openings formed in the barrel. When the input pen is inserted into an input pen holding part of the personal digital assistant, the stopping members, properly projecting exteriorly through the openings of the barrel, are pressed against an inner surface of the input pen holding part. Thus, the input pen will not move even if there is a space between the barrel and the inner surface of the input pen holding part.

3 Claims, 14 Drawing Sheets

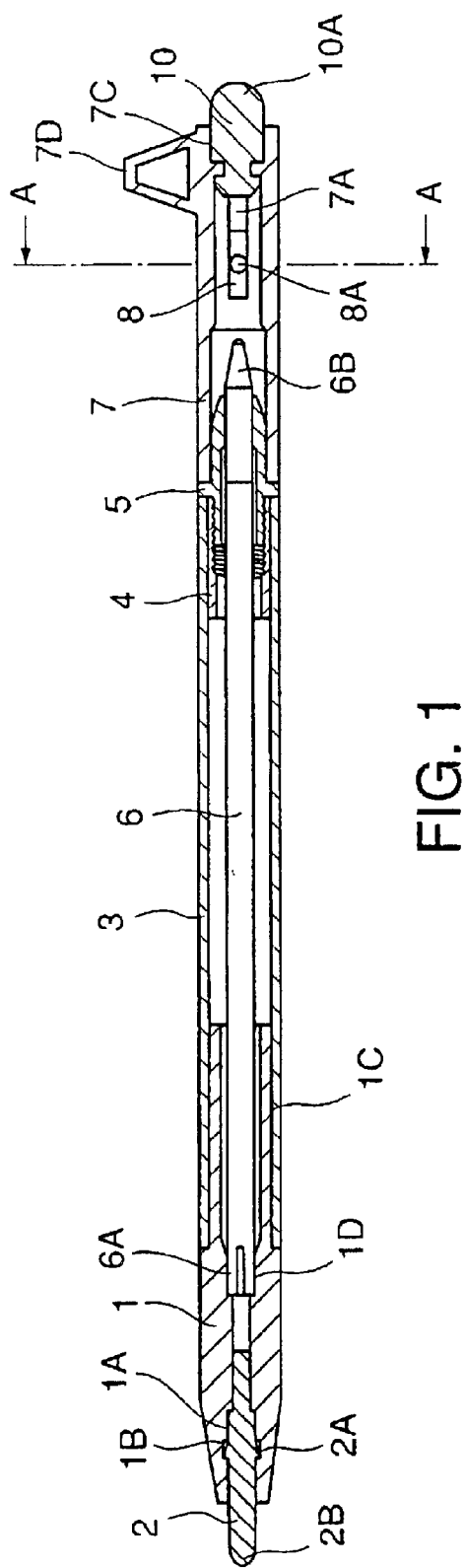
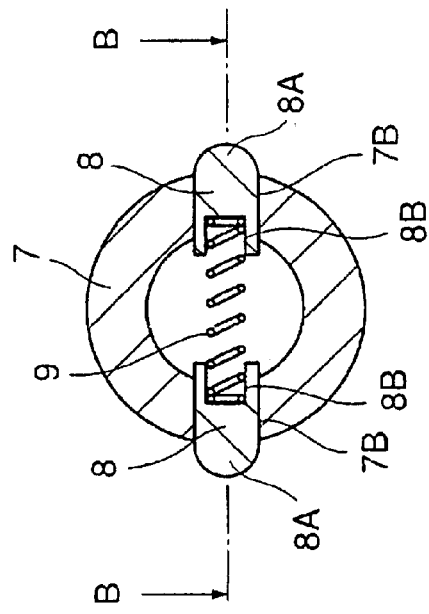
FIG. 1
FIG. 2

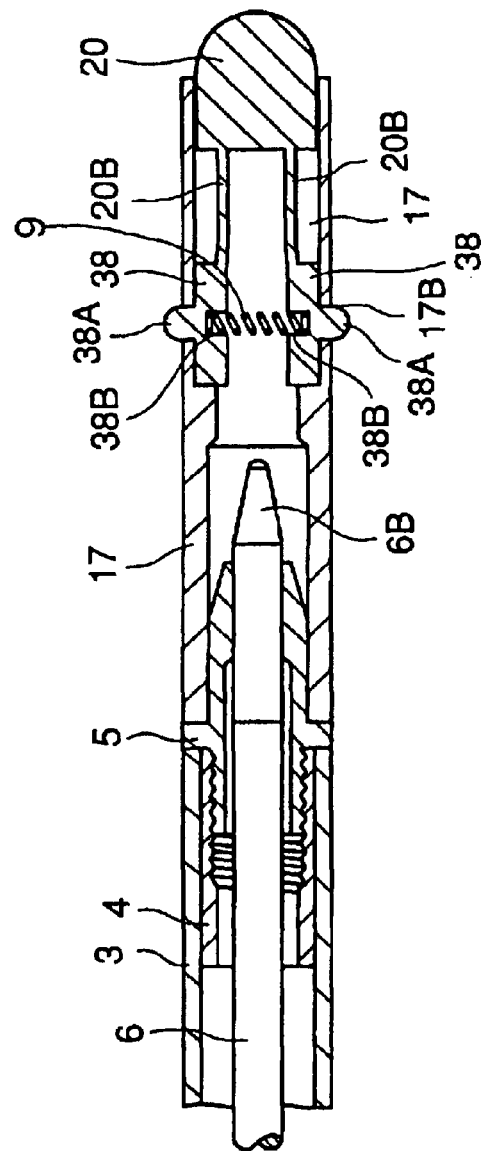
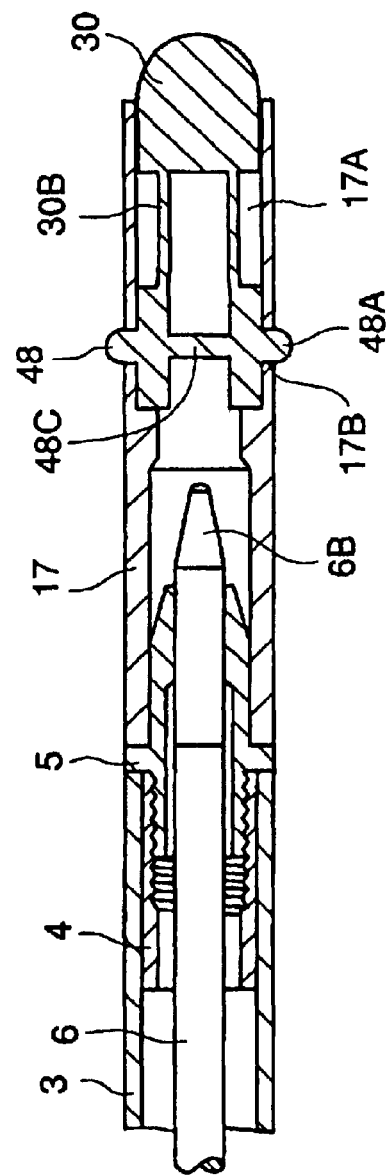

INPUT PEN

BACKGROUND OF THE INVENTION

1. Field of the Invention

The present invention relates to an input pen that is held in an input device, such as a personal digital assistant.

2. Description of the Related Art

Although some users use a standard input pen that is delivered as an attachment together with an input device, such as a personal digital assistant, when the input device is bought, for writing information, many users who bought an input device use an additionally bought input pen superior in function to the standard input pen. However, respective input pen holding parts of different personal digital assistants are different from each other in terms of inside diameter and holding structure, and hence the users are required to buy a special input pen for the personal digital assistant bought by the users.

A standard input pen designed for a particular personal digital assistant cannot be used when the particular personal digital assistant is replaced with a different personal digital assistant. An input pen bought by a user for use in combination with the user's personal digital assistant becomes useless when the user buys a new personal digital assistant, and hence the user needs to buy another input pen for the new personal digital assistant.

SUMMARY OF THE INVENTION

According to a first aspect of the present invention, an input pen to be used in combination with an input device comprises: a barrel; openings formed in the barrel; stopping members respectively having projections fitted in the openings of the barrel, respectively; and an elastic member extended between the stopping members so as to make the projections project properly outside through the openings, respectively; wherein the input pen is held in an input pen holding part of the input device with the stopping members engaged with the input pen holding part.

In the input pen according to the first aspect of the present invention, the barrel is provided in diametrically opposite parts of an inner surface of its back part with longitudinal grooves extending forwardly from a back end thereof, the openings are formed in proper parts of the grooves, the projections of the stopping members placed in the two grooves project through the openings of the barrel, respectively, and the elastic member is a compression coil spring having opposite ends inserted in holes formed in the stopping members placed opposite to each other to push the stopping members outwardly. In the input pen according to the first aspect of the present invention, the elastic member can have a C-shaped section, and the elastic member can be formed integrally with the stopping members. In the input pen according to the first aspect of the present invention, a front input member formed of a synthetic resin is placed in a front part of the barrel, a back input member formed of a soft material is placed in a back part of the barrel, and the back input member is formed integrally with the stopping members.

According to a second aspect of the present invention, an input pen to be used in combination with an input device comprises: a barrel; elastic parts formed in the barrel and capable of being elastically bent; and projections formed on the elastic parts; wherein the input pen is held in an input pen holding part of the input device with the projections pressed against an inner surface of the input pen holding part of the input device.

The elastic parts can be formed in the barrel by cutting U-shaped slits in the barrel. Alternatively, the elastic parts can be formed in the barrel by cutting longitudinal, parallel slits in the barrel.

In the input pen according to the second aspect, an elastic member may be placed in the barrel at a position corresponding to the elastic parts of the barrel.

According to a third aspect of the present invention, an input pen to be used in combination with an input device comprises: a barrel; openings formed diametrically opposite to each other in the barrel; a tubular member fitted in the openings; an elastic member held in the tubular member; and stopping members inserted in opposite end parts of the tubular member, respectively, and pressed by the elastic member so as to project properly from opposite ends of the tubular member; wherein the input pen is held in an input pen holding part of the input device with the stopping members engaged with an inner surface of the input pen holding part of the input device. In the input pen according to the third aspect of the present invention, the opposite ends of the tubular member may be bent radially inwardly to hold the stopping members in the tubular member. In the input pen according to the third aspect of the present invention, the elastic member may be a coil spring.

BRIEF DESCRIPTION OF THE DRAWINGS

FIG. 1 is a sectional view of an input pen of a first embodiment according to the present invention;

FIG. 2 is a sectional view taken along line A—A in FIG. 1;

FIG. 9 is a sectional view of an input pen in a fourth modification of the input pen of the first embodiment;

FIG. 10 is a sectional view of an input pen in a fifth modification of the input pen of the first embodiment;

DETAILED DESCRIPTION OF THE PREFERRED EMBODIMENTS

An input pen of a first embodiment according to the present invention will be described with reference to FIGS. 1 to 10.

Figure 3:
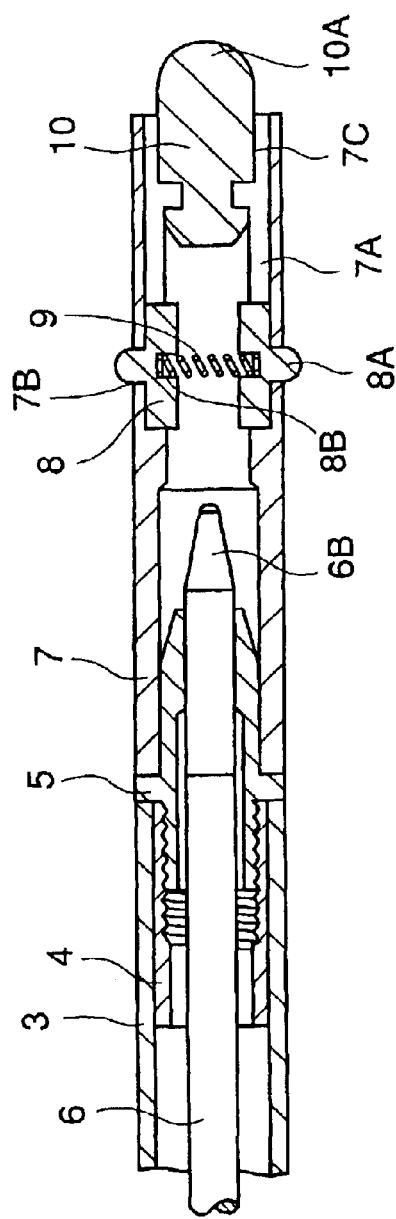
FIG. 3 is a sectional view taken along line B—B in FIG. 2.

The input pen of the first embodiment will be described with reference to FIGS. 1, 2 and 3. In FIG. 1, it is assumed that the left side is the front side, and the right side is the back side of the pen. A front barrel 1 formed of a synthetic resin has a front bore 1A provided with an annular groove 1B. A front input member 2 formed of a synthetic resin is provided with a flange 2A. The flange 2A has a flat front surface perpendicular to an axis of the front input member 2, and a tapered back surface tapering toward the back side. The front input member 2 is pressed in the front bore 1A of the front barrel 1 so as to be held fixedly in the front bore 1A with the flange 2A fitted in the annular groove 1B. Thus, the front input member 2 is held firmly fixedly in the front barrel 1. A front end part of the front input member 2 is rounded properly to form an input part 2B.

A back end part, having an outer surface 1C, of the front barrel 1 is fixedly pressed into a middle barrel 3, i.e., a metal pipe of a stainless steel or the like. An internally threaded bush 4 is fixedly pressed in a back part of the middle barrel 3. A front part of a barrel coupling member 5 is detachably screwed into the bush 4. A back end part 6A of a ballpoint refill 6 is fitted into a holding bore 1D formed in the front barrel 1. A writing head 6B of the ballpoint refill 6 projects properly backwardly from a back end of the barrel coupling member 5. The back end part 6A of the ballpoint refill 6 is slotted so as to be bendable such that the back end part 6A can be held by a proper pressure in the holding bore 1D and the ballpoint refill 6 is easily detachable.

A back barrel 7 is detachably placed on the barrel coupling member 5. Diametrically opposite grooves 7A are formed in the back barrel 7 so as to extend longitudinally forwardly from a back end of the back barrel 7, and openings 7B are formed in diametrically opposite parts of the grooves 7a. A bore 7C of a large diameter is formed in a back end part of the back barrel 7. A protrusion 7D projects from an outer surface of a back part of the back barrel 7. Stopping members 8 having a width corresponding to that of the grooves 7A are fitted into the grooves 7A. Each of the stopping members 8 is provided at its middle part with a projection 8A corresponding to one of openings 7B. The two stopping members 8 are provided at their inner ends with holes 8B, and opposite ends of a coil spring 9 are pressed into the holes 8B of the stopping members 8.

The stopping members 8, held with the coil spring 9 compressed, are inserted through the back end of the back barrel 7, are moved forwardly along the grooves 7A of the back barrel 7 until the projections 8A of the stopping members 8 are inserted into the openings 73 of the back barrel 7. The projections 8A project properly outside through the openings 7B. A soft back input member 10 is fitted into the bore 7C formed in the back end part of the back barrel 7. The back input member 10 has a semispherical input part 10A. The back input member 10 is formed of a soft material, such as rubber.

The barrel 7 is detachably placed on the barrel coupling member 5 to protect the writing head 6B of the ballpoint refill 6.

The front barrel 1, the middle barrel 3 and the back barrel 7 form a barrel.

Figure 4:
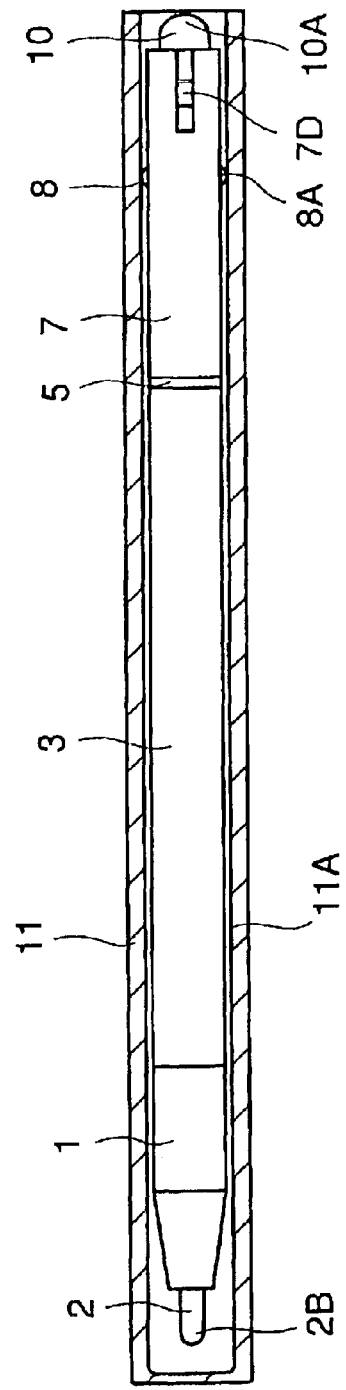
FIG. 4 is a sectional view of a personal digital assistant holding the input pen of the present invention.
Figure 5:
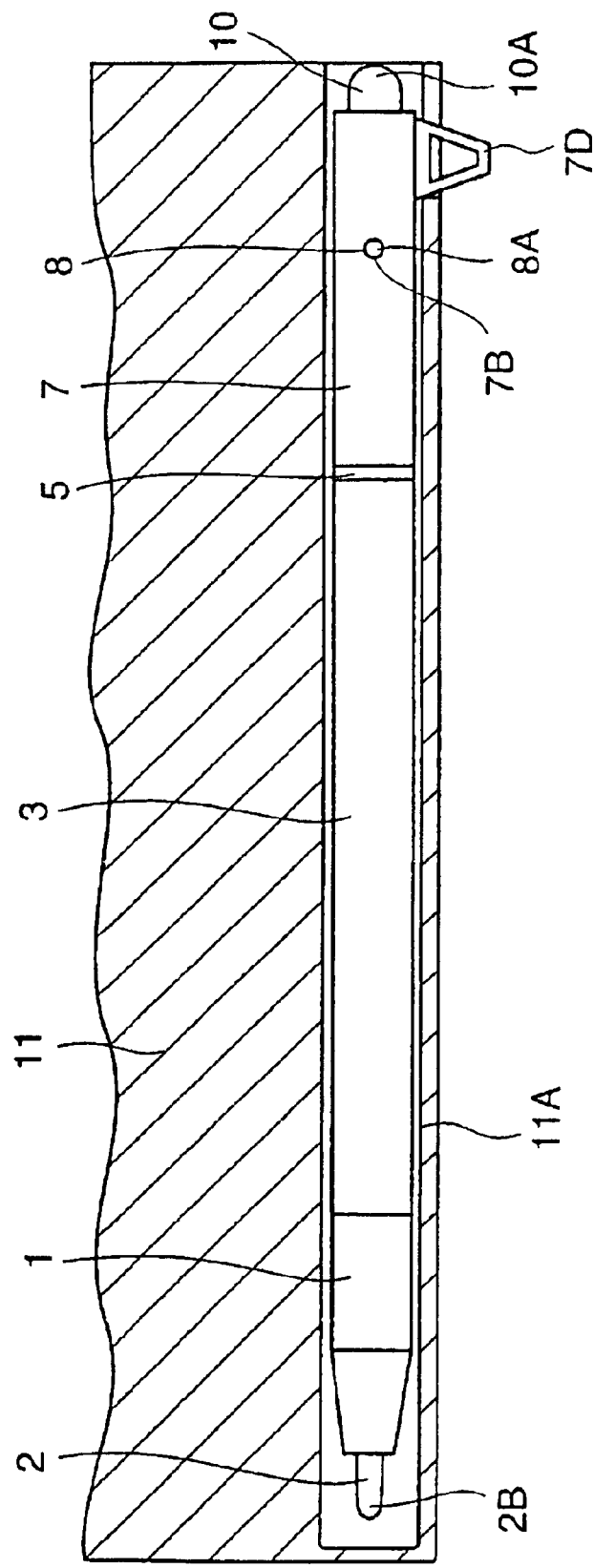
FIG. 5 is a sectional view of a principal part of a personal digital assistant holding the input pen of the first embodiment of the present invention.

The input pen thus formed is inserted into an input pen holding part 11A of a personal digital assistant 11 as shown in FIGS. 4 and 5. The projections 8A of the stopping members 8 projecting outside through the openings 7B of the back barrel 7 are pressed against an inner surface of the input pen holding part 11A to hold the input pen in the input pen holding part 11A such that the input pen does not move. The protrusion 7D formed in the back barrel 7 projects properly from the input pen holding part 11A.

In removing the input pen from the personal digital assistant, the protrusion 7D is pushed. The front input member 2 is pressed against and moved along a touch panel to enter small characters and the like to achieve a minute input operation. The soft back input member 10 is pressed against the touch panel for pointing.

In using the ballpoint refill 6, the back barrel 7 is removed to expose the writing head 6B of the ballpoint refill 6. In replacing the ballpoint refill 6 after ink has been exhausted therefrom, the barrel coupling member 5 is unscrewed from the bush 4 fitted in the middle barrel 3, the writing head 6B of the ballpoint refill 6 is held between fingers, the exhausted ballpoint refill 6 is pulled out of the middle barrel 3, and is replaced with a new ballpoint refill 6.

Figure 6:
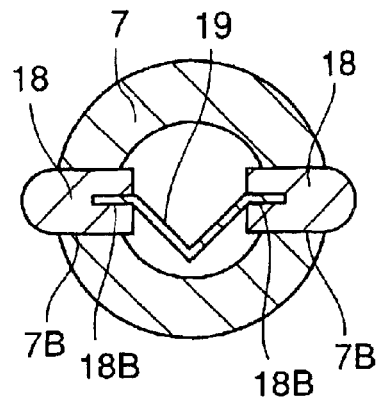
FIG. 6 is a sectional view of an input pen in a first modification of the input pen of the first embodiment.

FIG. 6 shows a part of an input pen in a first modification of the input pen of the first embodiment. This input pen is provided with two opposite stopping members 18 provided with recesses 18B, respectively, and a plate spring 19 bent at a right angle and having opposite ends fixedly pressed in the recesses 18B of the stopping members 18.

Figure 7:
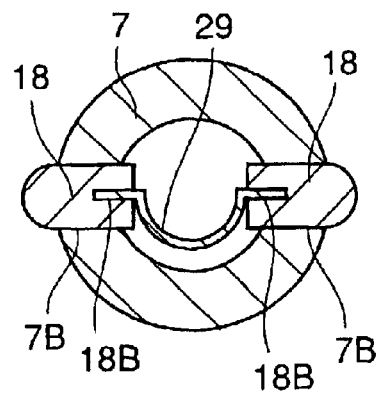
FIG. 7 is a sectional view of an input pen in a second modification of the input pen of the first embodiment.

FIG. 7 shows a part of an input pen in a second modification of the input pen of the first embodiment. This input pen is provided with two opposite stopping members 18 provided with recesses 18B, respectively, and a plate spring 29 having a C-shaped section and having opposite ends fixedly pressed in the recesses 18B of the stopping members 18.

Figure 8:
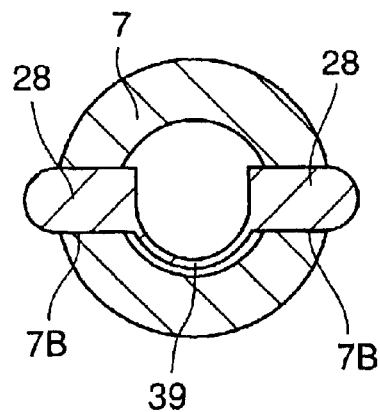
FIG. 8 is a sectional view of an input pen in a third modification of the input pen of the first embodiment.

FIG. 8 shows a part of an input pen in a third modification of the input pen of the first embodiment. This input pen is provided with an elastic member 39 having a C-shaped section, and two stopping members 28 formed integrally with the elastic member 39 at the opposite ends of the elastic member 39.

FIG. 9 shows an input pen in a fourth modification of the input pen of the first embodiment. In FIG. 9, parts identical with those shown in FIG. 1 are denoted by the same reference characters and description thereof will be omitted. Referring to FIG. 9, two opposite legs 20B extend forwardly from a front end of a soft back input member 20. Stopping members 38 are formed integrally with the legs 20B, respectively. The stopping members 38 are provided with recesses 38B in their inner surfaces, respectively, and are provided with projections 38A on their outer surfaces, respectively. A coil spring 9 is extended between the recesses 38B of the stopping members 38. The stopping members 38 and the back input member 20 are inserted through a back end of a back barrel 17 into the back barrel 17, and are moved forwardly with the stopping members 38 engaged in grooves 17A formed in the back barrel 17. Then, the projections 38A of the stopping members 38 drop into openings 17B formed in the back barrel 17 and project properly through the openings 17B, respectively. Thus, the stopping members 38 and the back input member 20 are retained in the back barrel 17.

FIG. 10 shows an input pen in a fifth modification of the input pen of the first embodiment. In FIG. 10, parts identical with those shown in FIG. 1 are denoted by the same reference characters and description thereof will be omitted. Referring to FIG. 10, two opposite legs 30B extend forwardly from a front end of a back input member 30 formed of rubber or a synthetic resin. Stopping members 48 are formed integrally with the legs 30B, respectively. A cross bar 48C is formed integrally with the stopping members 48 so as to extend between the stopping members 48. The stopping members 48 and the back input member 30 are inserted through the back end of a back barrel 17 into the back barrel 17 with the cross bar 48C between the stopping members 48 bent, and are moved forwardly with the stopping members 48 engaged in grooves 17A formed in the back barrel 17. Then, projections 48A of the stopping members 48 drop into openings 17B formed in the back barrel 17 and project properly through the openings 17B, respectively. Thus, the stopping members 48 and the back input member 30 are retained in the back barrel 17.

The present invention is not limited in its practical application to the foregoing embodiments; that is, the front input member does not necessarily need the flange, and the front input member may be simply pressed into the bore of the front barrel. The ballpoint refill may be omitted and a single barrel may be used instead of the front barrel, the middle barrel and the back barrel.

Although the invention has been described as applied to an input pen to be used in combination with a touch tablet, the present invention is not limited thereto and may be an input pen to be used in combination with various input devices other than a touch tablet.

When the input pen of the first embodiment is placed in the input pen holding part, the projections projecting outside through the openings of the barrel are pressed against the inner surface of the input pen holding part so as to hold the input pen in place. Therefore, the input pen will not move in the input pen holding part even if there is a space between the barrel of the input pen and the inner surface of the input pen holding part.

An input pen of a second embodiment according to the present invention will be described with reference to FIGS. 11 to 19.

Figure 11:
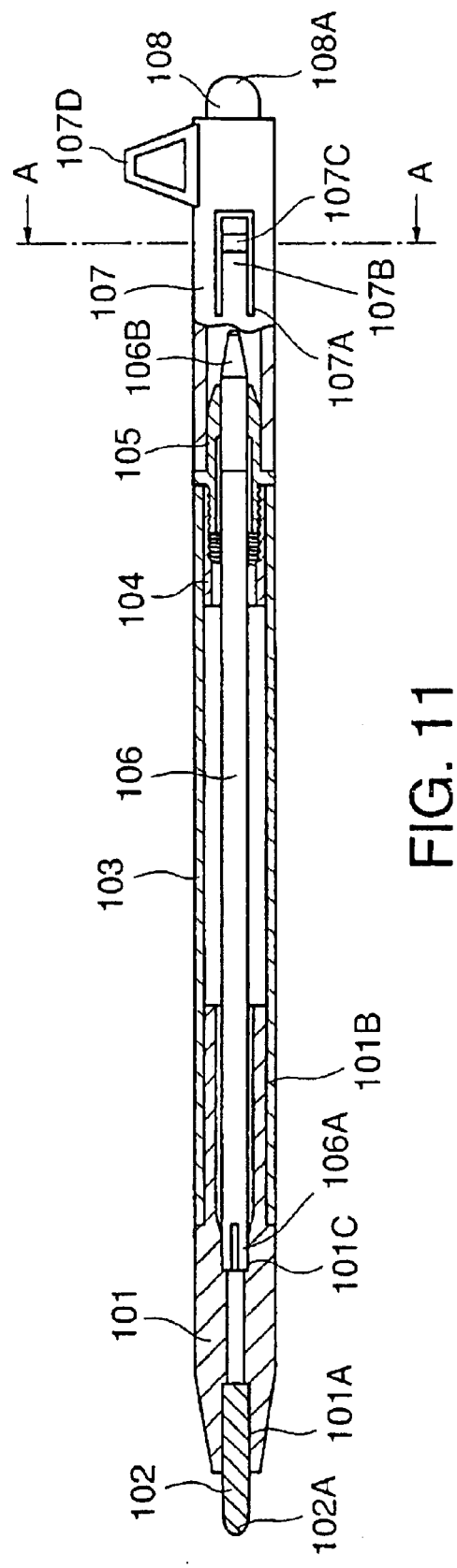
FIG. 11 is a sectional view of an input pen of a second embodiment according to the present invention.
Figure 12:
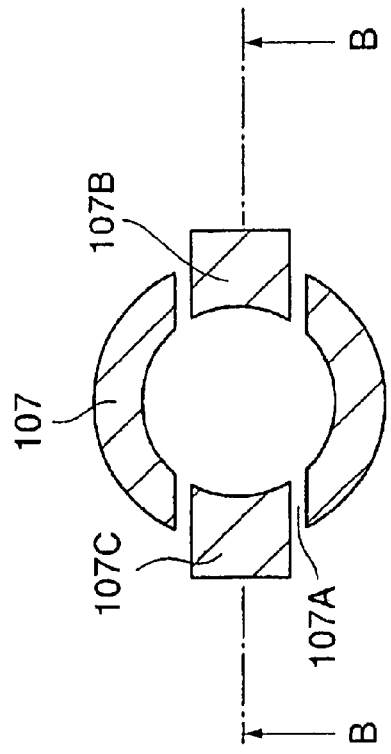
FIG. 12 is a sectional view taken along line A—A in FIG. 11.
Figure 13:
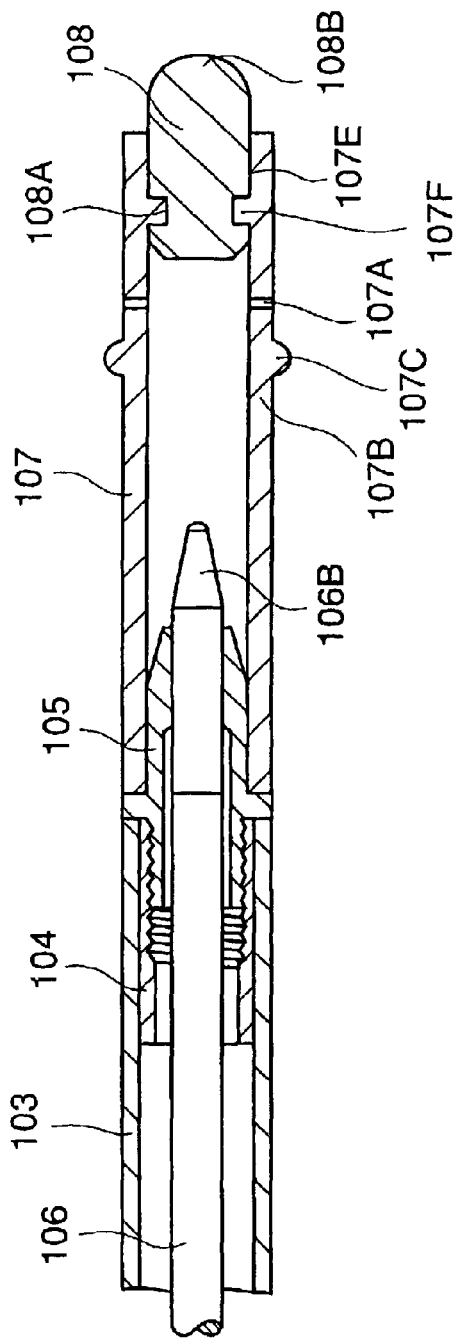
FIG. 13 is a sectional view taken along line B—B in FIG. 12.

The input pen of the second embodiment will be described with reference to FIGS. 11, 12 and 13. In FIG. 11, it is assumed that the left side is the front side, and the right side is the back side of the pen. A front barrel 101 formed of a synthetic resin has a front bore 101A. A back part of a front input member 102 formed of a synthetic resin is pressed into the bore 101A of the front barrel 101 so as to be held fixedly in place. A front end part of the front input member 102 is rounded properly to form an input part 102A.

A back end part having an outer surface 101B of the front barrel 101 is fixedly pressed into an middle barrel 103, i.e., a metal pipe of a stainless steel or the like. An internally threaded bush 104 is fixedly pressed into a back part of the middle barrel 103. A front part of a barrel coupling member 105 is detachably screwed into the bush 104. A back end 106A of a ballpoint refill 106 is fitted into a holding bore 101C formed in the front barrel 101. A writing head 106B of the ballpoint refill 106 projects properly backwardly from a back end of the barrel coupling member 105. The back end part 106A of the ballpoint refill 106 is slotted so as to be bendable such that the back end part 106A can be held by a proper pressure in the holding bore 101C and the ballpoint refill 106 is easily detachable.

A back barrel 107 is detachably placed on the barrel coupling member 105. Diametrically opposite U-shaped cuts 107A are formed in the back barrel 107 so as to form two elastic parts 107B. Projections 107C are formed on the elastic parts 107B, respectively. The projections 107C protrude properly from an outer surface of the back barrel 107. A protrusion 107D projects from the outer surface of a back part of the back barrel 107. The protrusion 107D is positioned substantially at a middle between the two elastic parts 107B.

A bore 107E and an inner annular ridge 107F are formed in a back part of the back barrel 107. The inner annular ridge 107F is engaged in an annular groove 108A formed in a soft back input member 108, formed of rubber or the like, to retain the back input member 108 in the bore 107E. The back input member 108 has a substantially semispherical input part 108B.

The back barrel 107 is detachably placed on the barrel coupling member 105 to protect the writing head 106B of the ballpoint refill 106 by the back barrel 107.

The front barrel 101, the middle barrel 103 and the back barrel 107 form a barrel.

Figure 14:
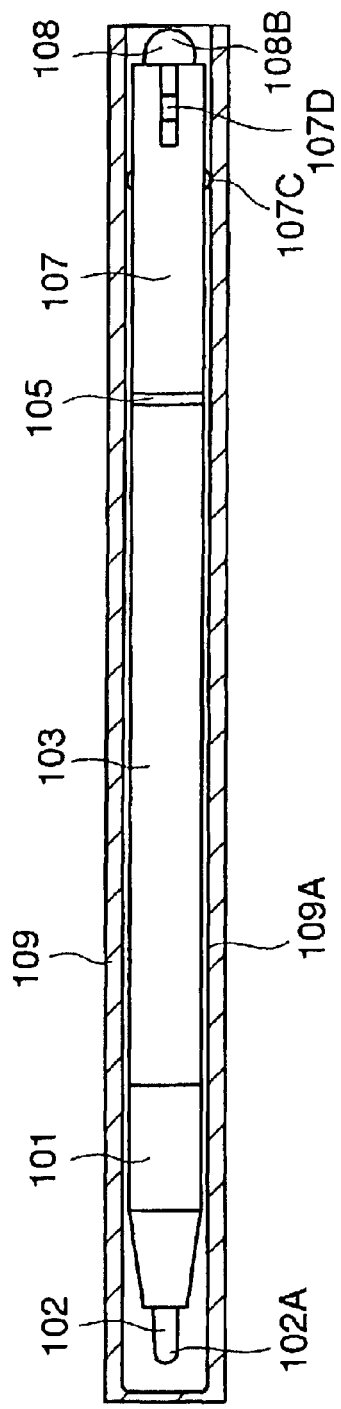
FIG. 14 is a sectional view of a personal digital assistant holding the input pen of the second embodiment of the present invention.
Figure 15:
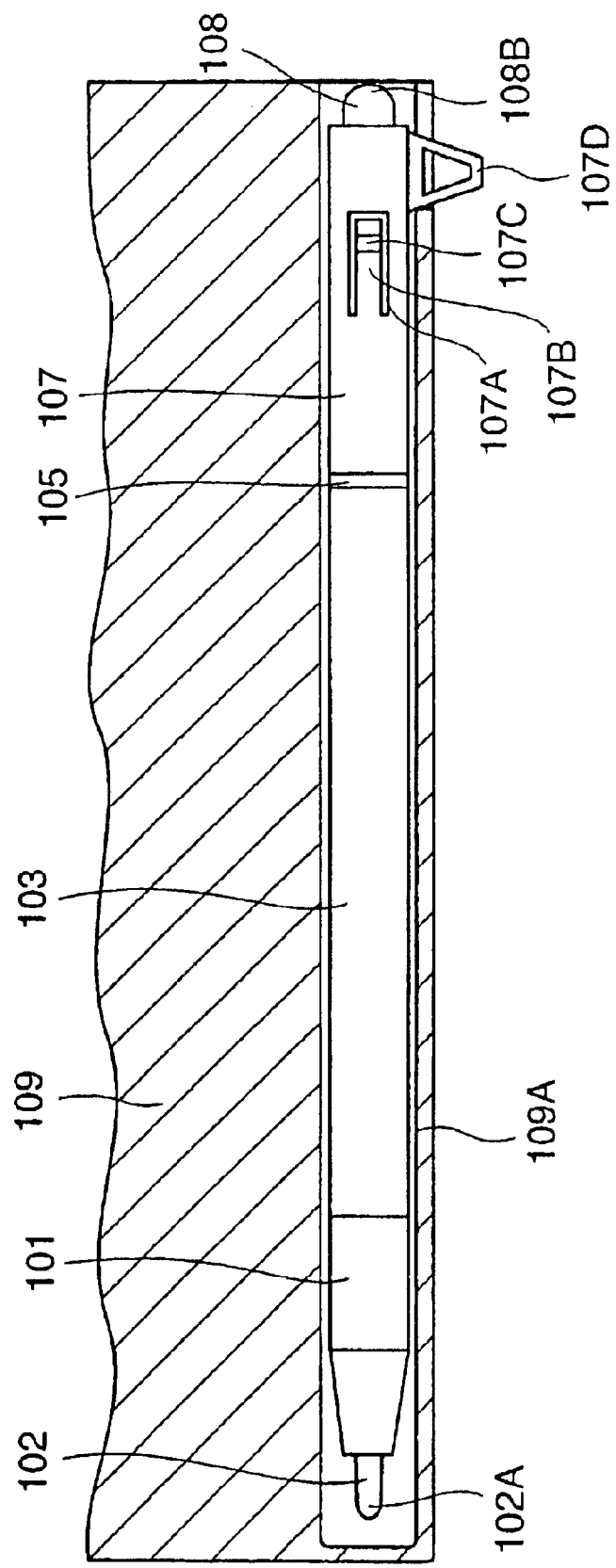
FIG. 15 is a sectional view of a principal part of a personal digital assistant holding the input pen of the second embodiment of the present invention.

The input pen thus formed is inserted into an input pen holding part 109A of a personal digital assistant 109 as shown in FIGS. 14 and 15. The projections 107C of the elastic parts 107B are pressed against an inner surface of the input pen holding part 109A to hold the input pen in the input pen holding part 109A such that the input pen does not move. The protrusion 107D formed on the back barrel 107 projects properly from the input pen holding part 109A.

In removing the input pen from the personal digital assistant 109, the protrusion 107D is pushed to extract the input pen from the input pen holding part 109A. The front input member 102 is pressed against and moved along a touch panel to enter small characters and the like to achieve a minute input operation. The soft back input member 108 is pressed against the touch panel for pointing.

In using the ballpoint refill 106, the back barrel 107 is removed to expose the writing head 106B of the ballpoint refill 106. In replacing the ballpoint refill 106 after ink has been exhausted therefrom, the barrel coupling member 105 is unscrewed from the bush 104 fitted in the middle barrel 103, the writing head 106B of the ballpoint refill 106 is held between fingers, the exhausted ballpoint refill 106 is pulled out of the middle barrel 103, and is replaced with a new ballpoint refill 106.

Figure 16:
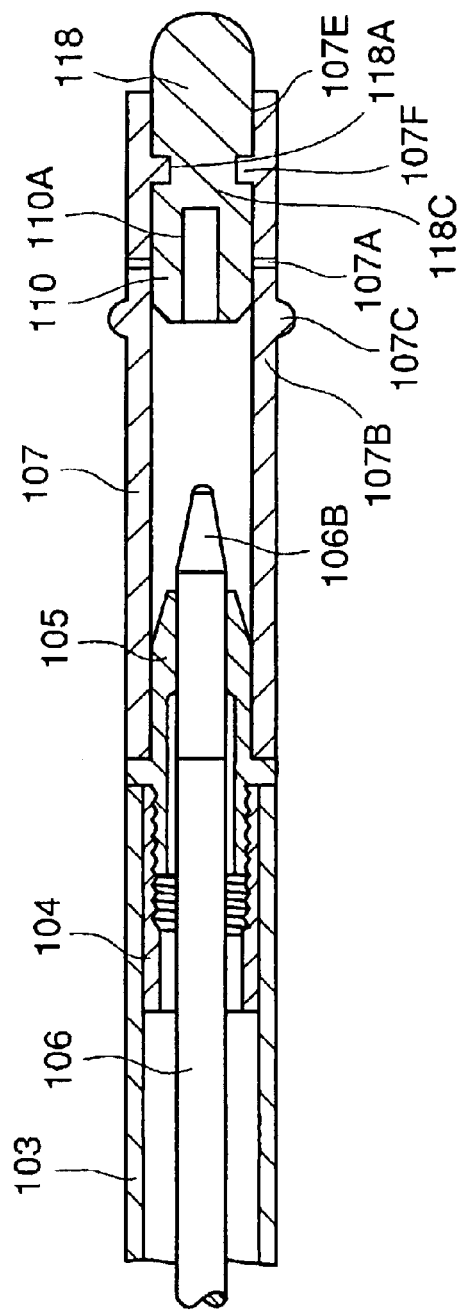
FIG. 16 is a sectional view of a principal part of an input pen in a first modification of the input pen of the second embodiment.

FIG. 16 shows a part of an input pen in a first modification of the input pen of the second embodiment. In FIG. 16, parts identical with those shown in FIG. 11 are denoted by the same reference characters and description thereof will be omitted. An elastic member 110 is formed integrally with a back input member 118 formed of rubber so as to extend forwardly from a front end 118C of a back input member 118. A hole 10A is formed in the elastic member 110 so that the elastic member 110 is deformable when a proper force is applied thereto. The elastic member 110 is in contact with inner surfaces of elastic parts 107B. An inner annular ridge 107F is engaged in an annular groove 118A formed in the back input member 118 so as to retain the back input member 118 in place.

When the input pen in the first modification of the second embodiment is inserted into an input pen holding part of a personal digital assistant, the elastic parts 107B are bent inwardly so that inner surfaces thereof are pressed against the elastic member 110. Since the elastic member 110 is provided with the hole 10A, projections 107C formed on the elastic parts 107B are pressed against an inner surface of the input pen holding part by a proper force. Thus, the projections 107C of the elastic parts 107B can be pressed stably for a long period of time.

Figure 17:
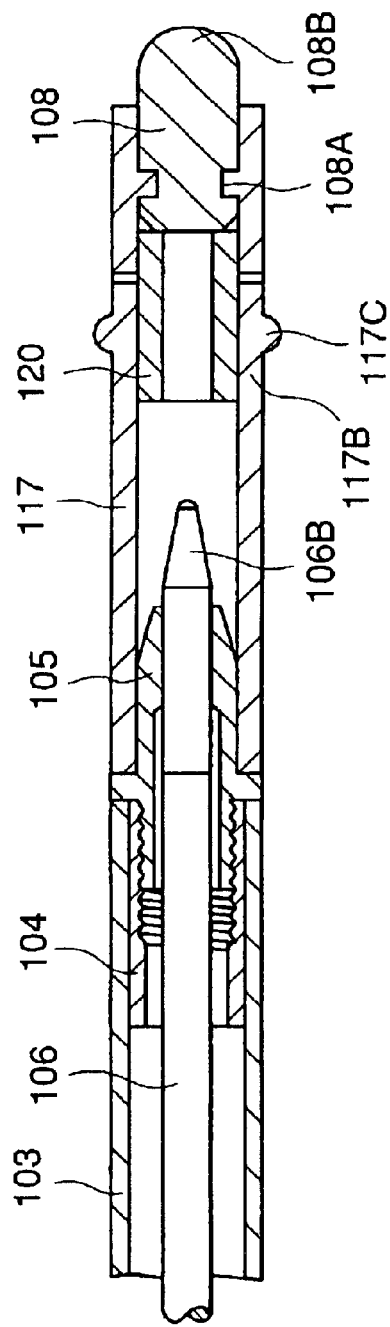
FIG. 17 is a sectional view of a principal part of an input pen in a second modification of the input pen of the second embodiment.

FIG. 17 shows an input pen in a second modification of the input pen of the second embodiment. In FIG. 17, parts identical with those shown in FIG. 11 are denoted by the same reference characters and description thereof will be omitted. As shown in FIG. 17, a tubular elastic member 120 formed of rubber is fitted into a back barrel 117 so as to be in contact with inner surfaces of elastic parts 117B of the back barrel 117.

The elastic member 120 presses projections 117C formed on the elastic parts 117B against an inner surface of an input pen holding part by a proper force. Thus, the projections 117C of the elastic parts 117B can be pressed stably for a long period of time.

Figure 18:
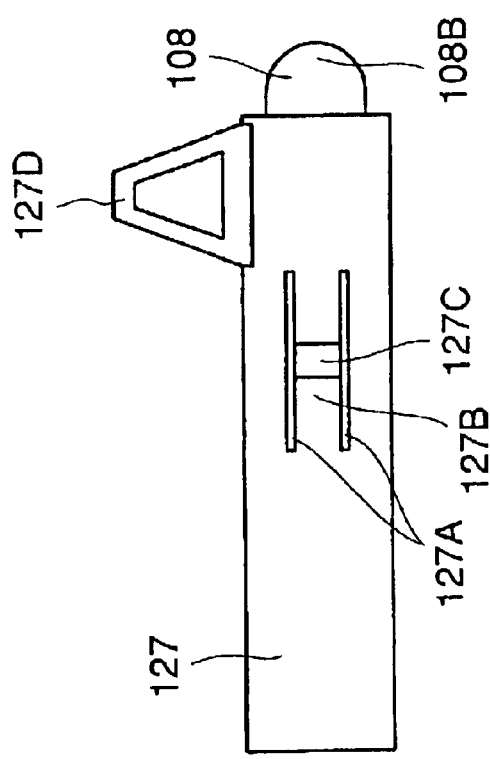
FIG. 18 is a sectional view of a principal part of an input pen in a third modification of the input pen of the second embodiment.
Figure 19:
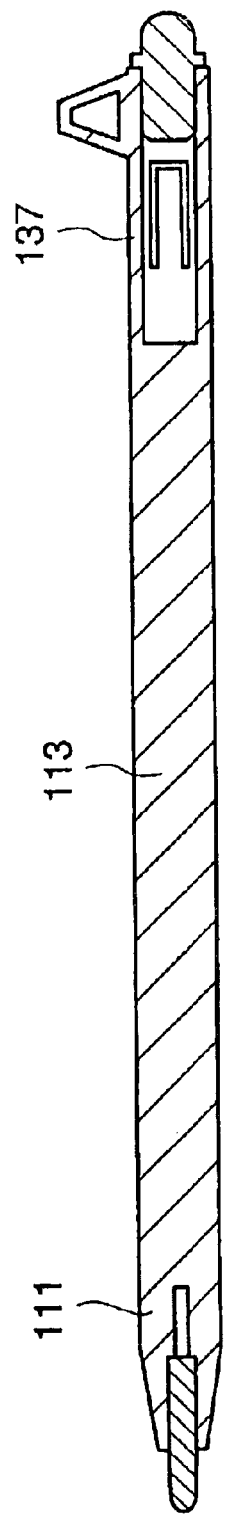
FIG. 19 is a sectional view of an input pen in a fourth modification of the input pen of the second embodiment.

FIG. 18 shows an input pen in a third modification of the input pen of the second embodiment. As shown in FIG. 18, longitudinal, parallel slits 127A are formed in a back barrel 127 to form two, diametrically opposite, elastic parts 127B. Projections 127C are formed on the elastic parts 127B, respectively, so as to project properly from an outer surface of the back barrel 127. A protrusion 127D projects from the outer surface of a back part of the back barrel 127. The protrusion 127D is positioned substantially at a middle between the two elastic parts 127B. A back input member 108 is attached to a back part of the back barrel 127.

The present invention is not limited in its practical application to the foregoing embodiments; that is, the ballpoint refill may be omitted and a single barrel may be used instead of the front barrel 101, the middle barrel 103 and the back barrel (107, 117, 127).

An input device to be used in combination with the input pen of the second embodiment is not limited to a touch tablet, and may be various input devices other than a touch tablet.

The input pen of the second embodiment is held in the input pen holding part with the projections formed on the elastic parts of the barrel pressed against the inner surface of the input pen holding part.

Thus, the input pen of the present invention can be held in input pen holding parts having different shapes of various personal digital assistants, and the input pen will not move even if there is a space between the barrel of the input pen and an inner surface of the input pen holding part.

An input pen of a third embodiment according to the present invention will be described with reference to FIGS. 20 to 26.

Figure 20:
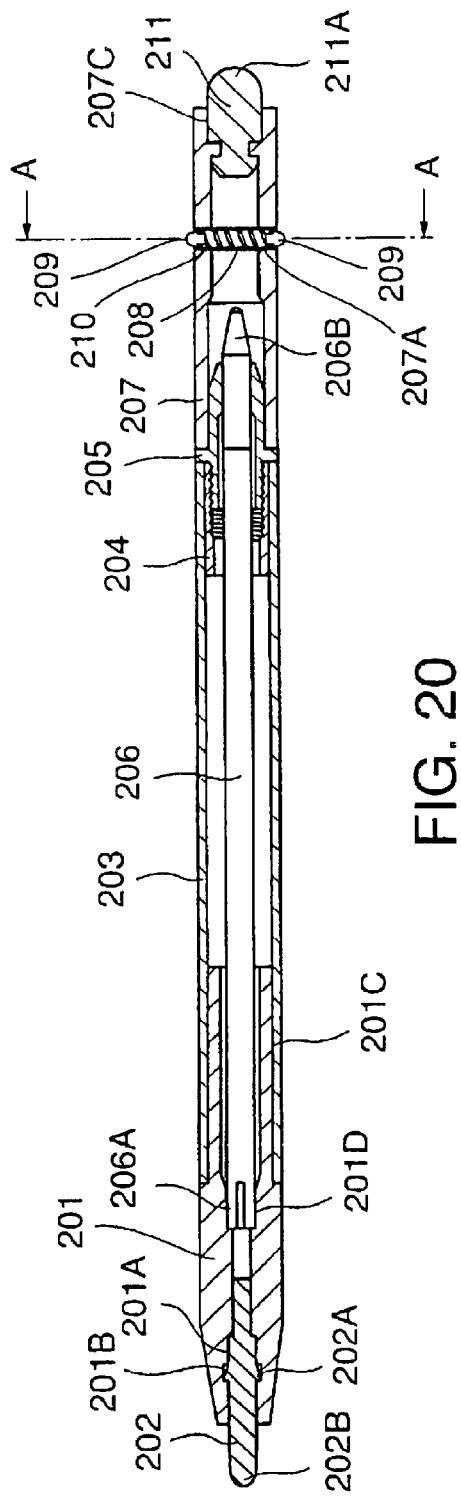
FIG. 20 is sectional view of an input pen of a third embodiment according to the present invention.
Figure 21:
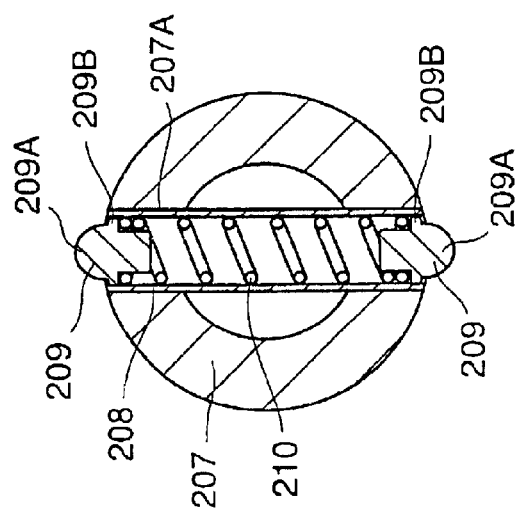
FIG. 21 is a sectional view taken along line A—A in FIG. 20.
Figure 22:
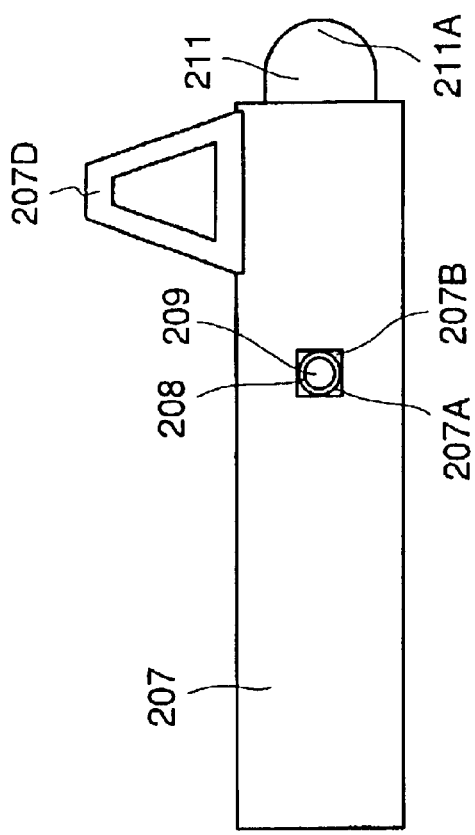
FIG. 22 is an enlarged plan view of a back barrel, a tubular member and a stopping member shown in FIG. 20.

The input pen of the third embodiment will be described with reference to FIGS. 20, 21 and 22. In FIG. 20, it is assumed that the left side is the front side, and the right side is the back side of the pen. A front barrel 201 formed of a synthetic resin has a front bore 201A provided with an annular groove 201B. A front input member 202 formed of a synthetic resin is provided with a flange 202A. The flange 202A has a flat front surface perpendicular to an axis of the front input member 202, and a tapered back surface tapering toward the back side. The front input member 202 is pressed into the front bore 201A of the front barrel 201 so as to be held fixedly in the front bore 201A with the flange 202A fitted in the annular groove 201B. Thus, the front input member 202 is held firmly fixedly in the front barrel 201. A front end part of the front input member 202 is rounded properly to form an input part 202B.

A back end part, having an outer surface 201C, of the front barrel 201 is fixedly pressed into a middle barrel 203, i.e., a metal pipe of a stainless steel or the like. An internally threaded bush 204 is fixedly pressed into a back part of the middle barrel 203. A front part of a barrel coupling member 205 is detachably screwed into the bush 204. A back end 206A of a ballpoint refill 206 is fitted in a holding bore 201D formed in the front barrel 201. A writing head 206B of the ballpoint refill 206 projects properly backwardly from a back end of the barrel coupling member 205. The back end part 206A of the ballpoint refill 206 is slotted so as to be bendable such that the back end part 206A can be held by a proper pressure in the holding bore 201D and the ballpoint refill 206 is easily detachable.

A back barrel 207 is detachably placed on the barrel coupling member 205. Diametrically opposite openings 207A are formed in the back barrel 207. A recess having a square bottom 207B is formed by spot-facing around an outer end of each of the openings 207A so that each opening 207A opens in the square bottom 207B of a corresponding square recess. A bore 207C of a large diameter is formed on a back end part of the back barrel 207. The protrusion 207D projects from an outer surface of the back end part of the back barrel 207. As shown in FIG. 21, stopping members 209 are inserted into opposite end parts of a metal tube 208 formed of a stainless steel. Each of the stopping members 209 has a substantially spherical head 209A and is provided with a flange 290B. A coil spring 210 is extended between the stopping members 209. The opposite end parts of the metal tube 208 are bent inwardly to form circular inside edges, respectively. The circular inside edges of the opposite ends of the metal tube 208 engage with the flanges 209B of the stopping members 209 so as to hold the stopping members 209 in the metal tube 208 with the heads 209A of the stopping members 209 projecting properly from opposite ends of the metal tube 208. The stopping members 209 are formed of a synthetic resin, rubber or a metal. The metal tube 208 is pressed into the openings 207A of the back barrel 207 so that the metal tube 208 is held fixedly in place. The heads 209A of the stopping members 209 project properly exteriorly from an outer surface of the back barrel 207.

A soft back input member 211 is fitted into the bore 207C formed in the back end part of the back barrel 207. The back input member 211 has a substantially semispherical input part 211A. The back input member 211 is formed of a soft material such as rubber.

The back barrel 207 is detachably placed on the barrel coupling member 205 to protect the writing head 206B of the ballpoint refill 206 by the back barrel 207.

The front barrel 201, the middle barrel 203 and the back barrel 207 form a barrel.

Figure 23:
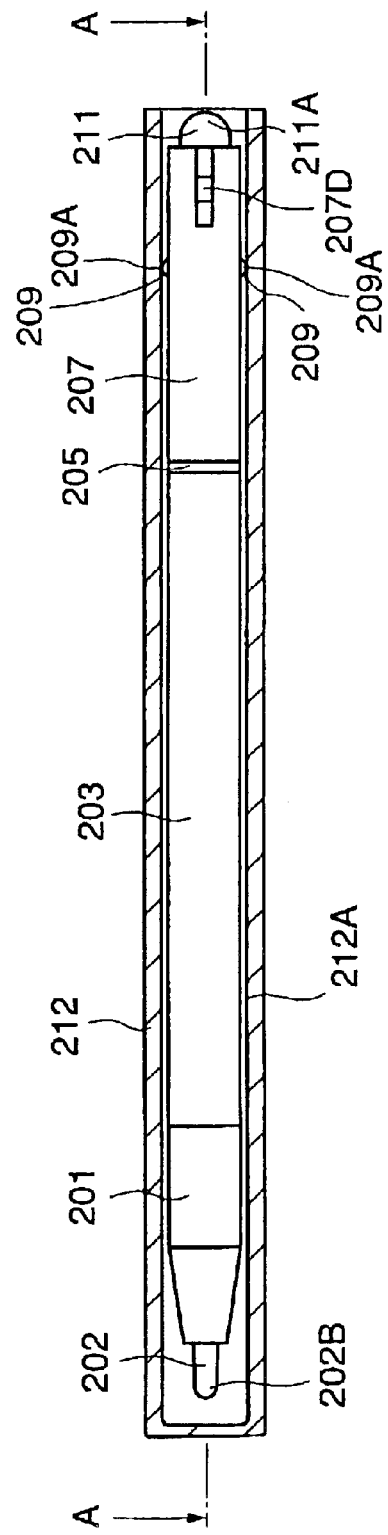
FIG. 23 is a sectional view of a personal digital assistant holding the input pen shown in FIG. 20.
Figure 24:
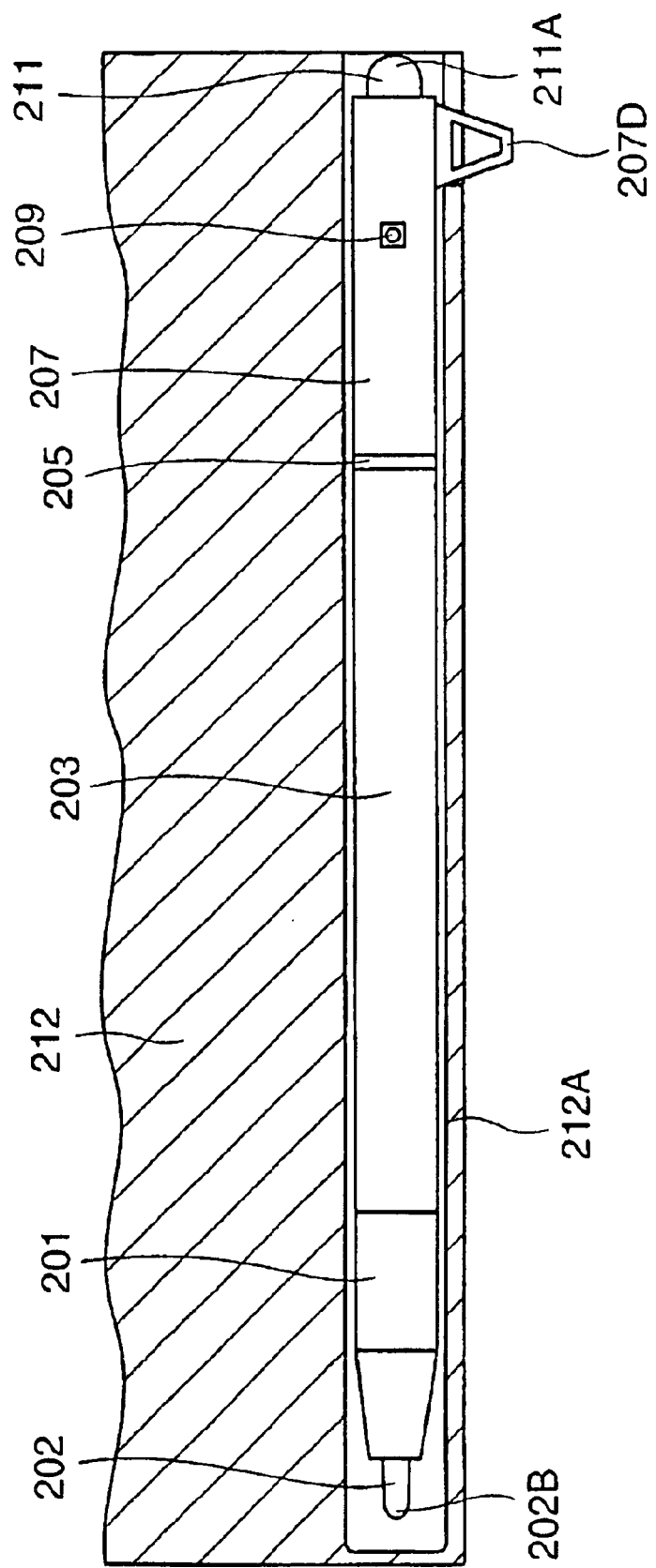
FIG. 24 is a sectional view of a principal part taken along line A—A in FIG. 23.

Referring to FIGS. 23 and 24, the input pen is inserted into an input pen holding part 212A of a personal digital assistant 212 with the heads 209A of the stopping members 209 pressed against an inner surface of the input pen holding part 212A. Thus, the input pen is held in the input pen holding part 212A so that the input pen does not move. The protrusion 207D formed on the back barrel 207 projects properly from the input pen holding part 212A.

In removing the input pen from the personal digital assistant 212, the protrusion 207D is pushed. The front input member 202 is pressed against and moved along a touch panel to enter small characters and the like to achieve a minute input operation. The soft back input member 211 is pressed against the touch panel for pointing.

In using the ballpoint refill 206, the back barrel 207 is removed to expose the writing head 206B of the ballpoint refill 206. In replacing the ballpoint refill 206 after ink has been exhausted therefrom, the barrel coupling member 205 is unscrewed from the bush 204 fitted in the middle barrel 203, the writing head 206B of the ballpoint refill 206 is held between fingers, the exhausted ballpoint refill 206 is pulled out of the middle barrel 203, and is replaced with a new ballpoint refill 206.

Figure 25:
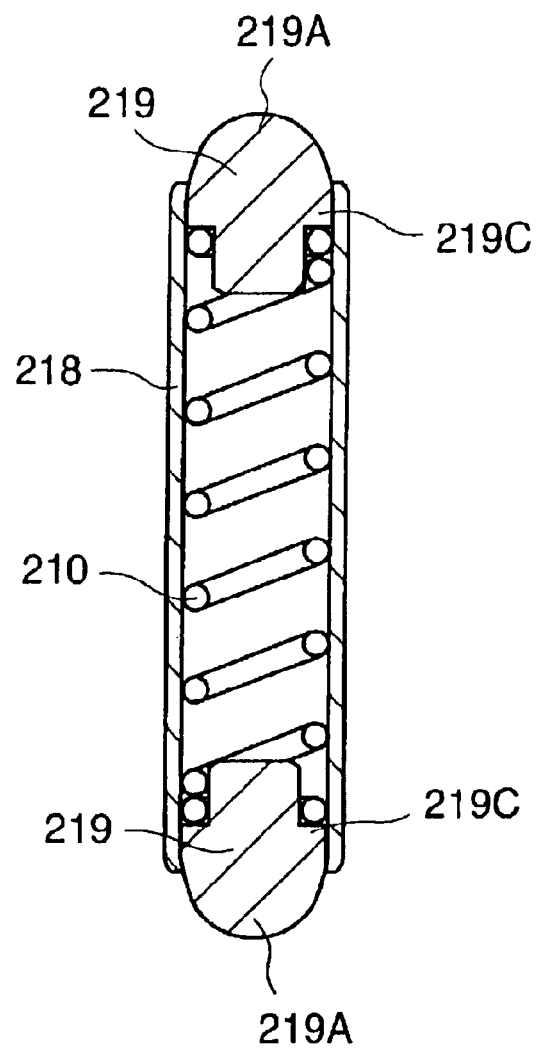
FIG. 25 is a sectional view of a metal tube and stopping members included in an input pen in a first modification of the input pen shown in FIG. 20.

FIG. 25 shows a tube 218 and stopping members 219 included in an input pen in a first modification of the input pen of the third embodiment. Each of the stopping members 219 has a round head 219A having a shoulder 219C. The stopping members 219 are inserted into opposite end parts of a metal tube 218. A coil spring 210 is extended between the shoulders 219C of the stopping members 219. The opposite end parts of the metal tube 218 are bent inwardly to form circular inside edges, respectively. The circular inside edges of the opposite ends of the metal tube 218 hold the stopping members 219 in the tube 218 with the heads 219A of the stopping members 219 projecting properly from the opposite ends of the metal tube 218.

Figure 26:
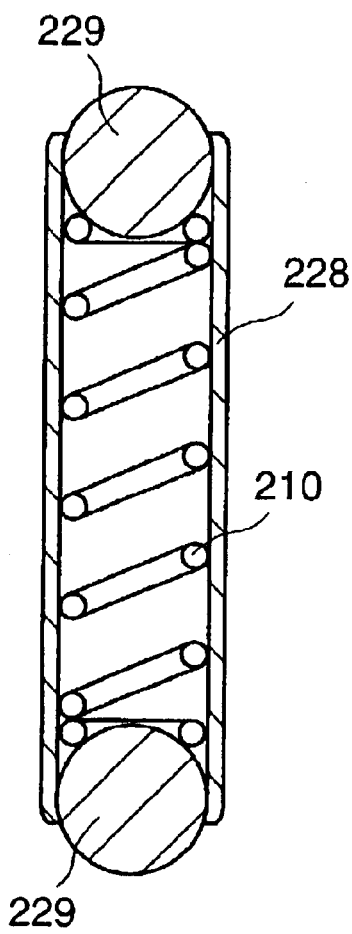
FIG. 26 is a sectional view of a metal tube and stopping members included in an input pen in a second modification of the input pen shown in FIG. 20.

FIG. 26 shows a tube 228 and stopping members 229 included in an input pen in a second modification of the input pen of the third embodiment. The stopping members 229 are spherical balls and inserted and retained in opposite end parts of the metal tube 228. A coil spring 210 is extended between the stopping members 229.

The metal tubes of the foregoing embodiments may be formed of brass.

Although the invention has been described as applied to an input pen to be used in combination with a touch tablet, the present invention is not limited thereto and may be input pens to be used in combination with various input devices other than a touch tablet.

In the input pen of the third embodiment, the stopping members held in the metal tube are pushed outwardly by the elastic member so as to protrude from the opposite ends of the metal tube. The metal tube is pressed into openings formed in the barrel. When the input pen is inserted into an input pen holding part, the stopping members are pressed against an inner surface of the input pen holding part.

Thus, the input pen can be held in input pen holding parts having different shapes of various personal digital assistants, and will not move in an input pen holding part even if there is a space between the barrel of the input pen and an inner surface of the input pen holding part. The metal tube holding the stopping members and the barrel can be assembled simply by pressing the metal tube into the openings of the barrel. Thus, the stopping members can be securely held on the barrel and will not come off the barrel.

What is claimed is:

1. An input pen to be used in combination with an input device, said input pen comprising:

a barrel;

openings formed diametrically opposite to each other in said barrel;

a tubular member fitted in said openings;

an elastic member held in said tubular member; and stopping members inserted in opposite end parts of said tubular member and biased by said elastic member so as to project from opposite ends of said tubular member;

such that when the input pen is held in an input pen holding part of an input device said stopping members are engaged with an inner surface of the input pen holding part of the input device.

2. The input pen according to claim 1, wherein opposite end parts of said tubular member are bent radially inwardly to hold said stopping members in said tubular member.

3. The input pen according to claim 1, wherein said elastic member comprises a coil spring.

* * * * *